(12) United States Patent
Price et al.

(10) Patent No.: US 9,607,391 B2
(45) Date of Patent: Mar. 28, 2017

(54) IMAGE OBJECT SEGMENTATION USING EXAMPLES

(71) Applicant: Adobe Systems Incorporated, San Jose, CA (US)

(72) Inventors: Brian Price, San Jose, CA (US); Zhe Lin, Fremont, CA (US); Scott Cohen, Sunnyvale, CA (US); Jimei Yang, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/817,731

(22) Filed: Aug. 4, 2015

(65) Prior Publication Data
US 2017/0039723 A1    Feb. 9, 2017

(51) Int. Cl.
*G06K 9/34*       (2006.01)
*G06T 7/00*       (2017.01)
*G06K 9/62*       (2006.01)

(52) U.S. Cl.
CPC .......... *G06T 7/0079* (2013.01); *G06K 9/6215* (2013.01)

(58) Field of Classification Search
CPC ... G06T 3/4053; G06T 7/0046; G06T 7/0079; G06T 7/0083; G06T 7/0087; G06T 7/0089; G06T 7/20; G06T 2207/10016; G06T 2207/10024; G06T 2207/20016; G06T 2207/20064; G06T 2207/20076; G06T 2207/20121; G06T 2207/20124; G06T 2207/30194; G06T 2207/30196; G06K 9/00281; G06K 9/00288; G06K 9/00362; G06K 9/00597; G06K 9/0061; G06K 9/00617; G06K 9/00906; G06K 9/4628; G06K 9/4671; G06K 9/6212; G06K 9/6215; G06K 9/6217; G06K 9/6229; G06K 9/6256; G06K 9/627; G06K 9/6277

See application file for complete search history.

(56) References Cited

U.S. PATENT DOCUMENTS

| | | | | |
|---|---|---|---|---|
| 8,194,938 B2* | 6/2012 | Wechsler | ........... | G06K 9/00288 382/118 |
| 8,675,999 B1* | 3/2014 | Liang | .................... | G06T 3/4053 382/299 |
| 8,873,838 B2* | 10/2014 | Suleyman | .......... | G06K 9/00362 382/157 |

* cited by examiner

*Primary Examiner* — Jose Couso
(74) *Attorney, Agent, or Firm* — Kilpatrick Townsend & Stockton LLP

(57) ABSTRACT

Systems and methods are disclosed herein for using one or more computing devices to automatically segment an object in an image by referencing a dataset of already-segmented images. The technique generally involves identifying a patch of an already-segmented image in the dataset based on the patch of the already-segmented image being similar to an area of the image including a patch of the image. The technique further involves identifying a mask of the patch of the already-segmented image, the mask representing a segmentation in the already-segmented image. The technique also involves segmenting the object in the image based on at least a portion of the mask of the patch of the already-segmented image.

20 Claims, 10 Drawing Sheets

IMAGE OBJECT SEGMENTATION USING EXAMPLES

TECHNICAL FIELD

This disclosure relates generally to computer-implemented methods and systems and more particularly relates to improving the efficiency and effectiveness of computing systems used to segment images to identify objects in images.

BACKGROUND

Prior techniques used to segment image objects have various deficiencies. Using manual selection to segment objects, for example, requires the tedious, time consuming, and sometimes frustrating task of manually selecting object boundaries. For example, using a mouse or other input device to draw a precise border around the object requires finely-controlled and often slow hand movements and can require a significant amount of time to draw and redraw such boundaries when initial attempts are not acceptable. It is desirable to avoid this frustrating user experience by using an automated image object segmentation technique.

However, automated techniques that have been used also have deficiencies. For example, prior automated techniques that use saliency to detect objects (i.e., using low level features such as color, contrast, compactness, etc.) only work well for images that have high foreground/background contrast and do not perform well for cluttered images. Other prior automated techniques are only suited for images in special object categories for which special trained category-specific models are available. For example, special trained models exist for human heads and can be used to identify heads in images. However, such models are not available for many categories of objects and have various other deficiencies that make them ill-suited for general use.

SUMMARY

Systems and methods are disclosed herein for using one or more computing devices to automatically segment an object in an image by referencing a dataset of already-segmented images. The technique generally involves identifying a patch of an already-segmented image in the dataset based on the patch of the already-segmented image being similar to an area of the image including a patch of the image. The technique further involves identifying a mask of the patch of the already-segmented image, the mask representing a segmentation in the already-segmented image. The technique also involves segmenting the object in the image based on at least a portion of the mask of the patch of the already-segmented image.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
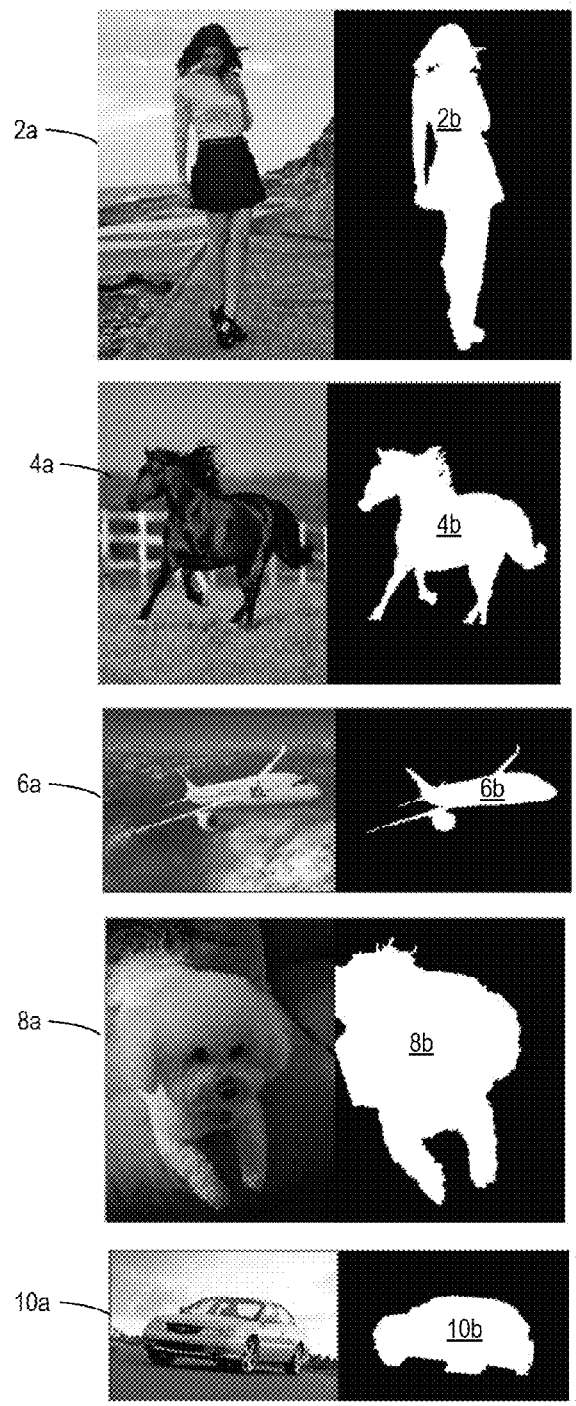
FIG. 1 is a plurality of graphics illustrating object segmentation examples produced using the techniques disclosed herein.

As discussed above, existing techniques used to segment image objects have various deficiencies. Using manual selection to segment objects, for example, requires the tedious, time consuming, and sometimes frustrating task of manually selecting object boundaries. Prior automated techniques also have deficiencies. For example, prior automated techniques that use saliency to detect objects (i.e., using low level features such as color, contrast, compactness, etc.) only work well for images that have high foreground/background contrast and do not perform well for cluttered images. Other prior automated techniques are only suited for images in special object categories for which special trained category-specific models are available, and such models are not available for many categories of objects.

The invention provides an automated technique that provides high quality image segmentation by referencing masks (prior segmentations of objects) for selectively-chosen patches of already-segmented images. For example, segmenting a person in an image from other portions of the image is informed by already-segmented images of people, i.e., using already identified masks identifying people in other images. Referencing masks from selectively-chosen patches of already-segmented images provides accurate segmentation even for cluttered images and even where special trained models are not available.

Referencing masks for individual patches (groupings of adjacent pixels having a square, rectangular, or other shape) rather than using entire image masks is advantageous because similar objects tend to share similar local shapes, but not necessarily entire object shape similarity. The masks for the individual patches can be selected based on their similarity to the corresponding patches in the image being segmented. For example, the image of Tom may have features that are similar to only certain portions of each of the images of Mark, Joe, Brett, etc. Tom's arm shape may be most similar to Mark's arm shape, Tom's head may be most similar to Joe's head, Tom's leg may be most similar to Brett's leg, etc. Selectively choosing patches allows masks for the most similar patches of the already-segmented images to be used. For example, such a technique can determine that the patch of Mark's arm is a better match for Tom's arm than patches of Joe's and Brett's arms and, thus, select to use a portion of a mask associated with Mark's arm in segmenting Tom's arm. Thus, for each patch or area including a patch of an image (an image for which segmentation is being determined) a similar patch in one of the already-segmented images is selectively chosen. A relevant portion of the respective mask from each of these selectively-chosen patches is then used in segmenting the image. In this way, the technique references the most relevant mask information from each of multiple, already-segmented images to provide an accurate segmentation of an image.

Additional advantages are achieved in certain embodiments by using patches at multiple scales or using images at multiple scales. In one embodiment, large patches are used to obtain the basic structure of the object and smaller patches are used to more accurately localize the boundaries of the object. The segmentation can be performed by iteratively running an optimization that identifies a segmentation of an image. Initially the optimization can be run using large patches. The results of that initial optimization are used to rerun the optimization with smaller patches, and this process repeats using progressively smaller and smaller patches. Thus, in one embodiment, a cascade algorithm for coarse-to-fine object segmentation is used where, in each stage of the cascade, local shape mask candidates are selected to refine the estimated segmentation of previous stage iteratively.

Additional advantages are also achieved in one embodiment by determining alternative object segmentations based on already-segmented images. Alternative similar patches are identified as good matches for a given image patch or area including the given image patch and potential segmentations are then determined based on each similar patch mask. For example, both Mark's aim and Joe's aim in already segmented images may be selected as similar to Tom's arm in an image and alternative segmentations determined based on each. The alternatives can be presented to a user in a user interface. In one example, a user interface allows a user to choose from a segmentation in which the baseball bat in the person's hand is part of the person and an alternative segmentation in which the baseball bat is not part of the person. In one embodiment, the alternative segmentations are based on identifying that patches that match an image patch can be grouped into clusters (e.g., one cluster in which a hand is holding something and one cluster in which a hand is not holding something).

As used herein, the phrase "patch" refers to a groupings of adjacent pixels having a square, rectangular, or other shape. A 4×4 square patch for example has 16 pixels in a square shape with four rows of pixels across. A patch is smaller than an entire image and thus a given image can be divided into multiple patches. In one example, multiple, partially overlapping patches are identified for an image, e.g., a first patch and a second patch may include 16 pixels each and have 8 of those pixels in common.

As used herein, the phrases "query image," "input image," "image to be segmented" refer to an image for which a segmentation is being determined. Such an image may be a photograph, a scanned image, a frame of a video or animation, a drawing, a cartoon, or any other compilation of adjacent pixel or image data in which one or more objects are depicted.

As used herein the phrase "segmenting" an object in an image or portion of the image refers to identifying at least one object or portion of at least one object in the image or portion of the image.

As used herein, the phrase "mask" refers to a segmentation of an image or portion of an image. A mask generally defines the boundary or portion of the boundary of the object in an image. A mask can be graphically depicted using an outline of the object or by displaying the object in one color (e.g., white) and the surrounding background in another color (e.g., black). A mask need not be graphically displayed. For example, a mask can be information that identifies the location of the boundary or portion of the boundary of the object.

As used herein, the phrase "already-segmented images" refers to an image for which a mask has already been manually or automatically identified for at least a portion of an object in the image. A database of already-segmented images may include a set of images for which the objects have been manually or automatically identified to create masks.

Object segmentation involves resolving one or more of three ambiguities: region of interest (ROI), parts, and boundaries. Since ROIs are usually user-specific or the output of object detectors, the techniques disclosed herein are well-suited for solving ambiguities for parts and boundaries and producing high quality segmentation results for generic objects. FIG. 1 shows some object segmentation examples produced using the techniques disclosed herein. In FIG. 1, images 2*a*, 4*a*, 6*a*, 8*a*, 10*a*, are segmented to identify objects 2*b*, 4*b*, 6*b*, 8*b*, and 10*b*.

Current object segmentation algorithms have significant deficiencies as discussed herein. Interactive segmentation usually requires a lot of user work on object boundary details. Model-based approaches require recognizing the object to apply offline-trained category-specific models and very few object models other than face and human figures are available. Salient object segmentation only works well when the images have high foreground-background color contrast, and do not perform well for cluttered images. Compared to these, the techniques disclosed herein are automatic, flexible to data changes (more data leads to better results), not constrained by object categories and require no offline training.

Figure 2:
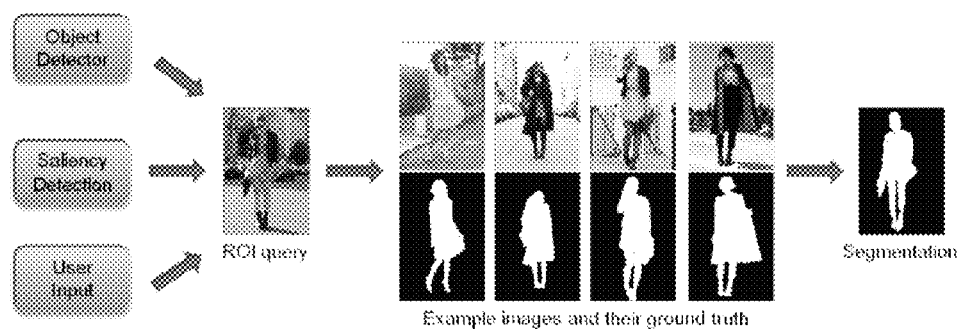
FIG. 2 gives a systematic overview of a generic object segmentation algorithm.

FIG. 2 gives a systematic overview of a generic object segmentation technique using examples. Given an input image or a ROI within an input image, the technique retrieves several similar example images and their ground truth segmentations from a database and uses them to deliver segmentation results for the input image or input ROI. Example-based algorithms usually consist of three components: image matching, segmentation transfer and boundary refinement. The technique first builds correspondences between the input image or input ROI and examples, and transfers the segmentation mask in the corresponding regions of the examples to produce an image segmentation. The technique produces better segmentation results with minimal computational cost.

Figure 3:
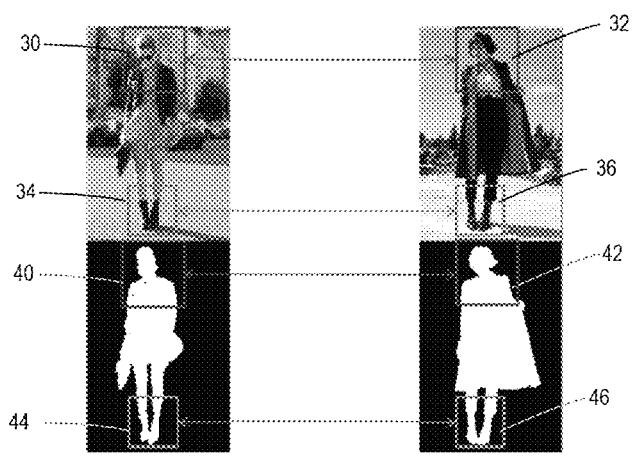
FIG. 3 is a graphic depicting how image content from two images in certain areas are similar and that the corresponding segmentation masks share similar shapes for those areas.

The basic assumption behind segmentation transfer is shape sharing—similar image patches usually imply similar object shapes. For example, FIG. 3 shows how the image content from two images within boxes 30, 32 are similar (head) as are the boxes 34, 36 (legs), and thus that the corresponding segmentation masks 40, 42 and 44, 46 share similar shapes, respectively. Note that other portions of the objects in the images do not have similar shapes.

Image Segmentation Using Patch Masks

The size of image patches are important to determine the content. Large patches better preserve object content (foreground/background), but their shapes vary around the contour; small patches are hard to preserve object content but their shapes could be very similar. One embodiment extracts image patches densely at four scales (128×128, 64×64, 32×32 and 16×16) and finds their best matches in 16 reference images so that for each patch, 16 segmentation candidates are identified. For each patch, the embodiment measures its segmentation transfer quality by calculating the similarity $S_b$ between ground truth segmentation and the best segmentation candidate and the similarity $S_a$ with the average of all the candidates. The higher $S_b$ means the more similar shapes the image patches share while the higher $S_a$ means the easier the segmentation can be transferred.

Figure 4:
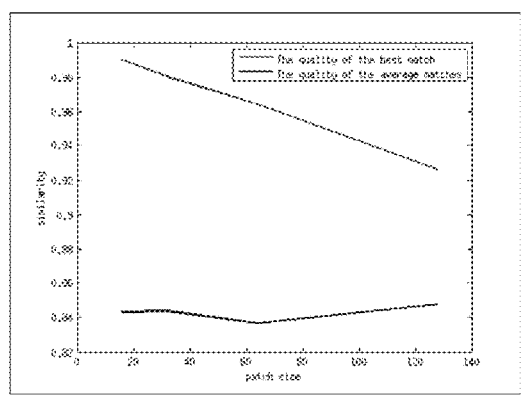
FIG. 4 is a chart illustrating how segmentation transferability changes with the size of image patches.

FIG. 4 is a chart illustrating how segmentation transferability changes with the size of image patches. FIG. 4 shows that the similarity of the best match and similarity of the average patches both vary with patch sizes. As the patch size increases, the similarity of the best match decreases. In other words, the smaller patches indicate the better shape shareability but the larger patches indicate the better segmentation transferability.

Figure 5:
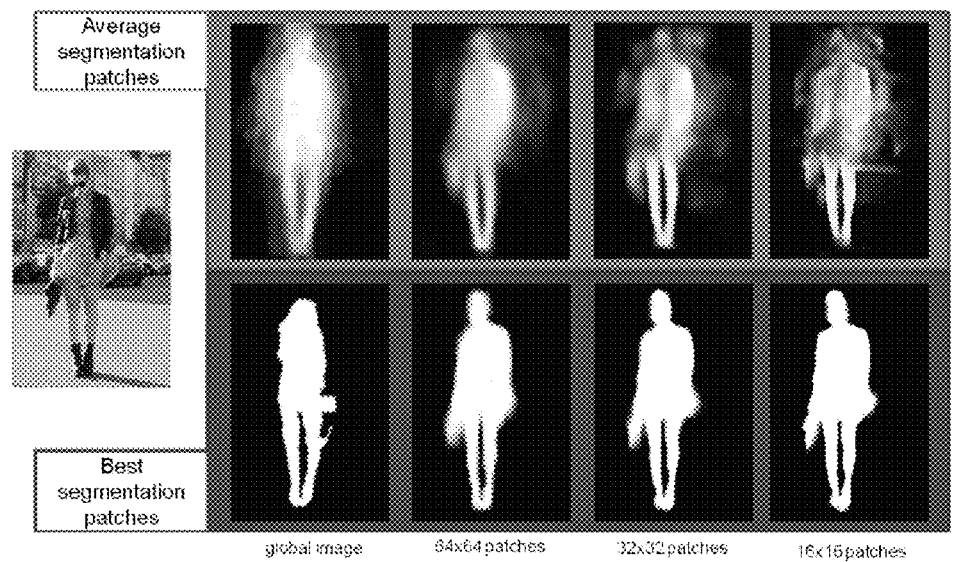
FIG. 5 provides images illustrating object segmentation by using transferred masks in different patch sizes.

FIG. 5 provides images illustrating object segmentation by using transferred masks in different patch sizes. All the transferred segmentation patches are stitched together to segment the object. In the top row, the average segmentation is transferred. In the bottom row, the best segmentation is transferred. This shows that using the best segmentation provides better results than using the average segmentation. It also shows that the best segmentation becomes better when patch size decreases.

As discussed below it can be advantageous to use patches of different sizes (i.e., multiple scales) in a multi-iteration segmentation technique. Such a technique allows the general shape of the object to be identified using large patches and then refined using progressively smaller and smaller patches to better capture object details.

Figure 6:
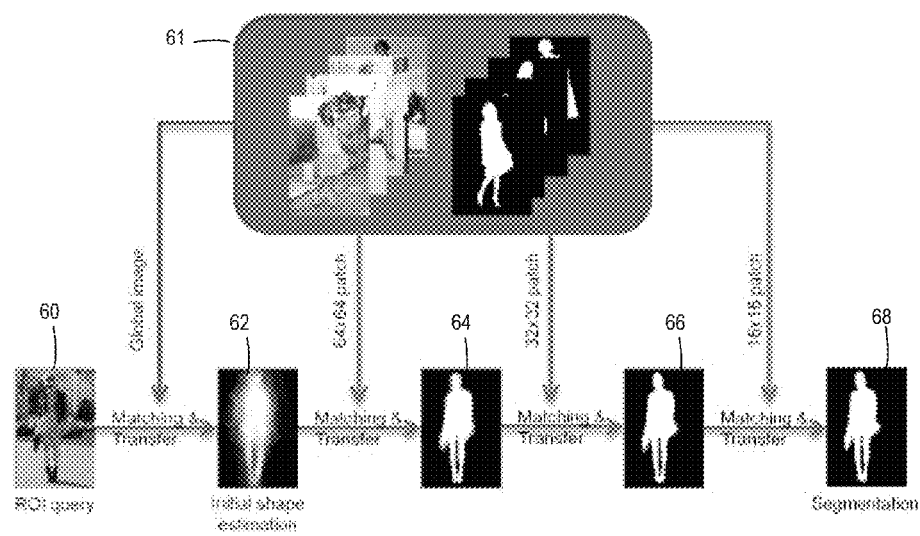
FIG. 6 is a diagram of an exemplary multi-scale object segmentation technique based on examples.

FIG. 6 is a diagram of an exemplary multi-scale object segmentation technique based on examples. In this process, a ROI query input image 60 is received. Given the ROI query input, the technique first finds its most similar reference images in database 61 and transfers the global segmentation masks to obtain the initial rough estimation of object shape 62. The technique then matches and transfers progressively smaller patches to improve the estimate. Specifically, the technique next matches and transfers several similar example images and their ground truth segmentations from the database 61 for relatively large patches, in this example 64×64 pixel patches, and uses these to improve the contour quality of the image to produce improved estimate 64. The technique next matches and transfers similar example images and their ground truth segmentations from the database 61 for relatively medium size patches, in this example 32×32 pixel patches, and uses these to improve the contour quality of the image to produce improved estimate 66. Then example images and their ground truth segmentations are matched and transferred from the database 61 for relatively small patches, in this example 16×16 pixel patches, and used to improve the contour quality of the image to produce segmentation 68. The number of iterations of progressively smaller patches is exemplary and different numbers of iterations can be used. In one embodiment only a single patch size is used. In one embodiment, only a single patch size is used without iteration.

Figure 7:
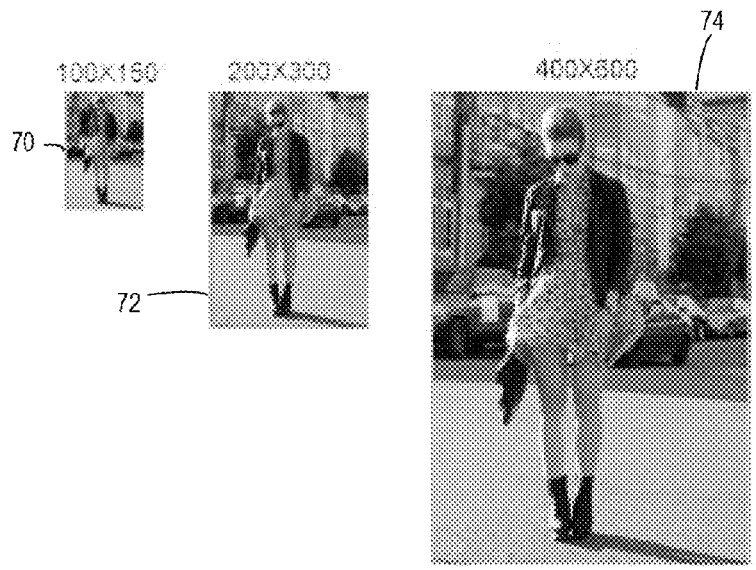
FIG. 7 illustrates a three layer image pyramid in which images of different size are used so that patch size can be constant in performing a multi-scale technique.

In one embodiment, instead of changing the size of patches, the size of images is changed to build an image pyramid for both the query input and the reference images. In each scale, the same size of image patches is used to perform matching and segmentation transfer. This can reduce the computational cost. FIG. 7 illustrates a three layer image pyramid in which images 70, 72, 74 of different size are used so that patch size can be constant in performing a multi-scale technique. By scaling the image to different sizes, patches taken from the images can be used in a single algorithm without changing the algorithm to account for different patch sizes. A 16×16 pixel patch in the small version of the image will represent a relatively larger portion of the image (e.g., it may include the entire upper body of a person depicted in the image) than a 16×16 pixel patch in a larger version of the image (e.g., which may include only a portion of the shoulder of the person).

Image Segmentation Using Patch Masks from Already-Segmented Images

One embodiment provides an automated technique that provides image segmentation by referencing masks for selectively-chosen patches of already-segmented images. For example, segmenting a car in an image from other portions of the image is informed by already-segmented images of cars and other objects. Referencing masks from selectively-chosen patches of already-segmented images provides accurate segmentation even for cluttered images and even where special trained models are not available. The masks for the individual patches can be selected based on their similarity to the corresponding patches in the image being segmented.

Figure 8:
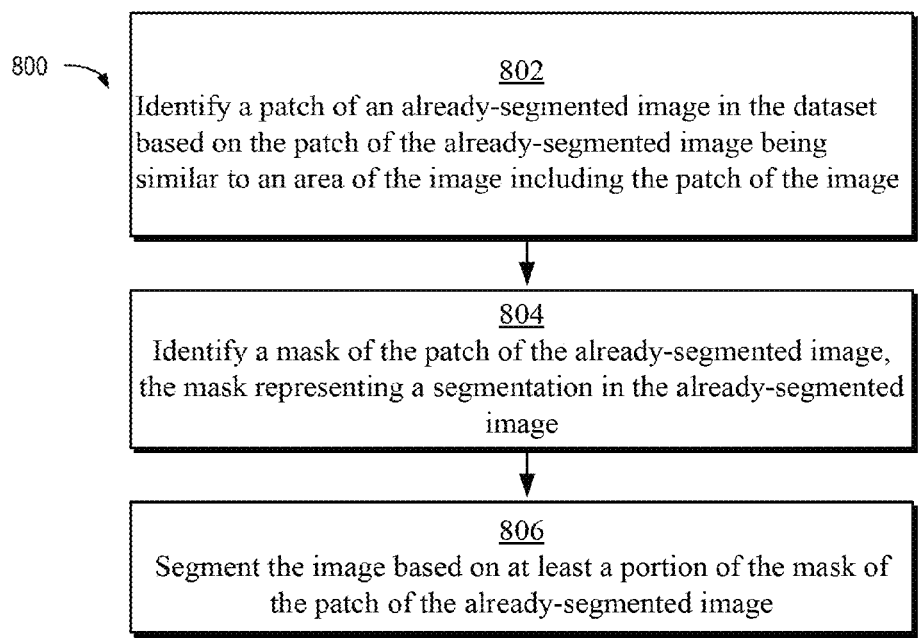
FIG. 8 is a flow chart of a method for automatically segmenting an object in an image by referencing a dataset of already-segmented images.

FIG. 8 is a flow chart of a method 800 for automatically segmenting an object in an image by referencing a dataset of already-segmented images. The method 800 involves a processor of one or more computing devices performing operations illustrated in blocks 802, 804, and 806.

Method 800 involves identifying a patch of an already-segmented image in the dataset based on the patch of the already-segmented image being similar to an area of the image including a patch of the image, as shown in block 602. In one embodiment, the patch of the already-segmented image is identified based on the patch being a better match for the area of the image including the patch of the image than other patches in other already-segmented images of the dataset.

In one embodiment, this involves identifying multiple already-segmented images in the dataset based on the multiple already-segmented images being similar to the image and identifying a respective patch in each of the identified multiple already-segmented images corresponding to the patch of the image, comparing the image with each respective patch to identify which respective patch is most similar to the area of the image including the patch of the image, and identifying the patch of the already-segmented image in the dataset based on the patch of the already-segmented image being the most similar to the area of the image including the patch of the image. Choosing the best matching patch can provide better results than using the average of all of the selected patches.

After identifying a patch of an already-segmented image, the method 800 further involves identifying a mask of the patch of the already-segmented image, the mask representing a segmentation in the already-segmented image, as shown in block 804. The masks can be selected based on mask similarity in patches of the already-segmented images that would partially overlap one another once transferred to the image, without entirely overlapping one another. For example, given two nearby patches of an image that overlap one another such as one patch of the upper arm of a person and one patch of the elbow of a person. The masks from already-segmented image patches selected for those two overlapping patches can be selected based on how well they match one another, i.e., do they line up well or not.

As discussed above patches or images at multiple scales are used in one embodiment to identify masks from patches in the already-segmented images in the dataset. For example, relatively large patches or smaller resolution versions of the images can be used to identify large structures of an object in the image and smaller patches or higher resolution versions of the images can be used to localize boundaries of the object in the image. In one embodiment an image hierarchy of different image scales with a fixed patch size is used as discussed herein. In another embodiment, a single image scale may be used with varying patch sizes.

After identifying a mask of the patch of the already-segmented image, the method 800 further involves segmenting the object in the image based on at least a portion of the mask of the patch of the already-segmented image, as shown in block 806. In one embodiment, segmenting the object in the image is based on masks from patches in multiple already-segmented images of the dataset, the masks used to segment different portions of the image. One embodiment involves iteratively running an optimization that identifies a segmentation of the image beginning with relatively larger patches and progressing to smaller and smaller patches. Segmenting the object in the image results in a mask depicting the segmentation of the image. The mask depicting the segmentation of the image is displayed in a user interface in one example.

One embodiment involves also determining alternative object segmentations based on patches from multiple already-segmented images of the dataset being similar to the patch of the image. In one example, alternative object segmentations are determined based on patches from multiple already-segmented images of the dataset being clustered into groupings with each grouping used to determine a respective alternative object segmentation. The alternative object segmentations are presented in a user interface that allows user selection of one of the alternative object segmentations.

The method 800 for automatically segmenting an object in an image by referencing a dataset of already-segmented images can be initialized in various ways. For example, this can involve initializing an optimization to segment the object in the image to provide an initial segmentation based on saliency of the object in the image, use of a specially-trained model, user input providing an approximate segmentation, user input providing an approximate object boundary, user input identifying a point on the object, user input identifying an approximate center of the object, user input providing an approximate object location, user input providing an approximate object localization, or user input providing an approximate object size. Thus, in certain cases, a user can provide a hint about the desired segmentation and an automated technique can take that information into account. In one embodiment, input is received identifying a portion of the image that includes an object to be segmented and segmenting the object in the image involves localizing patch masks from a set of already-segmented images in the dataset of content similar to the content within the user-identified portion of the image.

After initialization and an initial segmentation or run of the optimization algorithm, the technique refines the initial segmentation by referencing masks in patches in the already-segmented images of the dataset. More generally in certain embodiments, segmenting the object in the image is based both on the mask of the patch of the already-segmented image and saliency.

Figure 9:
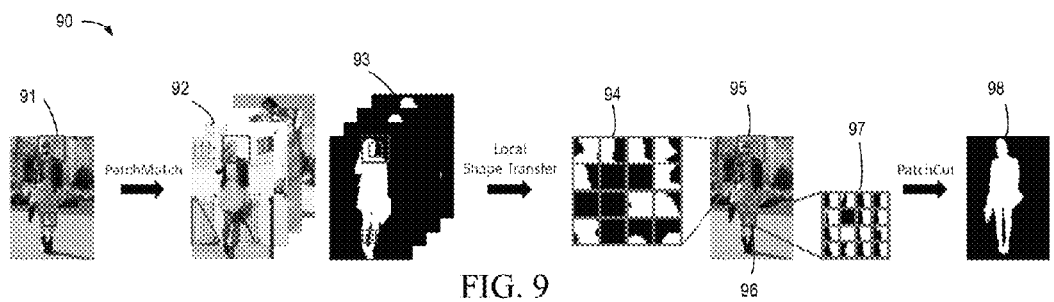
FIG. 9 presents an example technique that uses examples to segment an image.

FIG. 9 presents an overview of the proposed algorithm for segmenting an object in an image using examples. Given an image 91, a patch matching algorithm is used to identify matching patches in a set of already-segmented images 92 with segmentation examples 93. Local mask candidates 94, 97 representing the local shape are transferred for patches 95 and 96 for use in an optimization algorithm to produce segmentation 98. A best mask of potential masks 94 may be used and a best mask of potential masks 97 may be used. For example, local mask candidates are selected based on an MRF energy optimization function. This process may be iterated for different scales, for example, to refine a segmentation in a coarse-to-fine manner.

Local Shape Transfer Using Multiple Scales

Figure 10:
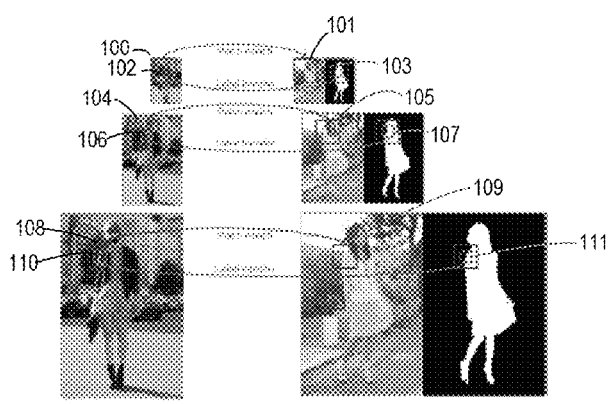
FIG. 10 provides images illustrating a multi-scale patch matching and segmentation transfer.

FIG. 10 provides images illustrating a multi-scale patch matching and segmentation transfer. In this example, extended patch 100 of an input image is used to find a matching (similar) extended patch 101 in a reference image. The local mask 103 corresponding to the reference image extended patch 101 is used for the patch 102 of the input image in determining a first iteration of segmentation of the input image. At the next iteration, extended patch 104 of a larger version of the input image is used to find a matching (similar) extended patch 105 in a larger version of the reference image. Because the images are larger, the patches include relatively smaller portions of the images than in the prior iteration. The local mask 107 corresponding to the reference image extended patch 105 is used for the patch 106 of the input image in determining a second iteration of the segmentation of the input image. At the third iteration, extended patch 108 of an even larger version of the input image is used to find a matching (similar) extended patch 109 in an even larger version of the reference image. Because the images are even larger, the patches include relatively smaller portions of the images than in the prior iterations. The mask 111 corresponding to the reference image extended portion 109 is used for the patch 110 of the input image in determining a third iteration of the segmentation of the input image.

Such a multi-layer image pyramid as is depicted in FIG. 10, can be built by downsampling both an image $\{I_s; s=1, 2, 3\}$ and example images $\{I_m^s, Y_m^s, s=1,2,3\}$. If the size of image I is [h;w], the size of downsampled image in the sth layer is $$\left[\frac{h}{2^{3-s}}, \frac{w}{2^{3-s}}\right].$$

For example, this technique is used in FIG. 10 in which for all three scales, image patches of the same size are used to perform matching and mask transfer. In each scale, (s=1; 2; 3), image patches of 16×16 are densely sampled at every 2 pixels $\{\Delta_k^s, k=1, 2, \ldots, K\}$ where $$K = \frac{h \times w}{4 \times 2^{6-2s}}.$$

For each patch of the image $\Delta^s_k$ 82, 86, 90 in FIG. 8, a SIFT descriptor $x_k^s$ is extracted from its extended 32×32 patch 80, 84, 88. Therefore, the matching problem between image I and the $m_{th}$ example $I_m$ can be described by:

$$\arg\min_{k'} \|x_k^s - x_{k'm}^s\|_1, \forall k=1,2,\ldots,K$$

where $x_{k'm}^s$ is the SIFT descriptor extracted from the $k'^{th}$ patch $\Delta^s_{k'}$ of the $m^{th}$ example. This nearest neighbor field problem is solved efficiently by a patch match algorithm. As a result, the image patch $\Delta^s_k$ finds its match $\Delta^s_{k*}$ in the $m^{th}$ example with the cost $d_{km}^s = \|x_k^s - x_{k'm}^s\|_1$.

The local segmentation masks from the matched patches in $m^{th}$ example are denoted as $z_{km}^s = Y_m^s(\Delta^s_{k'})_1$, which provide location and shape information for segmenting the image. Those local masks $z_k^s$ constitute a patch-wise segmentation solution space for the image; in other words, the segmentation mask of image Y can be well approximated by $z_{km}$. While different methods for image dense correspondences could be used to enable pixel-wise label transfer, this technique achieves structured label transfer (local masks) through a more flexible matching algorithm.

To examine the quality of local shape masks $z^s_{km}$, for each patch, $\Delta^s_k$, the mean of its local masks $$\bar{z}_k^s = \frac{1}{M} \sum_m z_{km}^s$$

is calculated, and the best possible $\bar{z}_k^s$ is found using the ground truth as a reference. The $\bar{z}_k^s$ defines the upper bound for local shape transfer. The mean shape prior mask $\overline{Q}_s$ can be immediately estimated by adding up $\bar{z}_k^s$. The oracle shape prior mask $\overline{Q}_s$ is estimated from $\bar{z}_k^s$.

Figure 11:
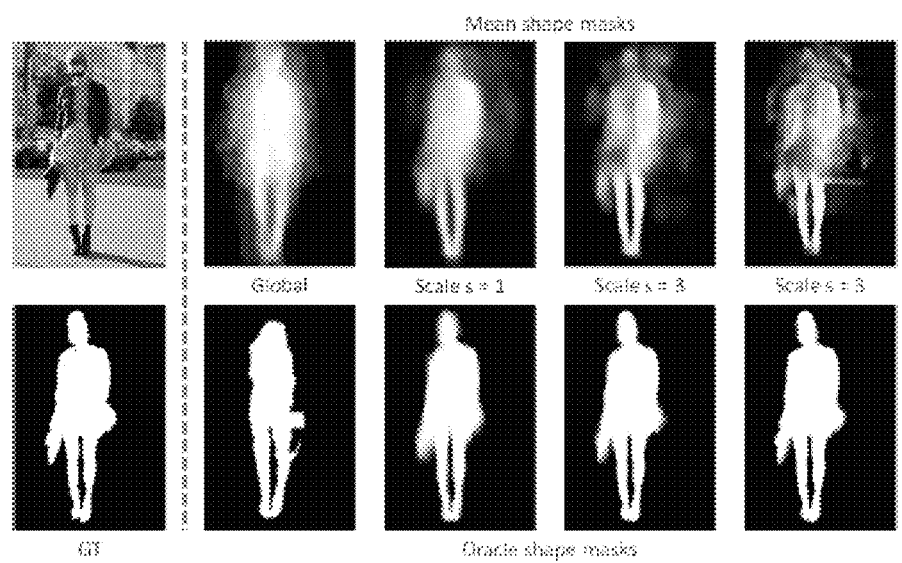
FIG. 11 illustrates mean and oracle shape prior masks of different scales.

FIG. 11 illustrates mean and oracle shape prior masks of different scales. Shape prior masks estimated from mean masks (top row) and best masks (bottom row) are shown at different scales. The masks are upsampled to the size of original image for better visualization. At the coarse scale, the object is well located but its boundary is blurry in the mean shape prior masks. Moving towards finer scales, although some parts of mean shape prior (legs) become clearer, other parts (head and shoulder) turn out to be very noisy. This is because the very local structures of image patches at the finer scales preserve well the edge patterns during matching, but local masks may have inconsistent foreground/background relationships. Both location and boundary qualities of oracle shape prior masks keep getting better from coarse to fine scales. This divergent result indicates that good segmentation solutions can be obtained if the right label patches are found at a fine scale, but without that knowledge, the average results are far from satisfactory. The above observations motivate the coarse-to-fine strategy of starting with a good approximation at the coarse scale which then leads to a choice of the right label patches at the fine scale.

Segmentation Algorithm

In this section, a novel algorithm to gradually estimate the shape prior $Q^s$ in a coarse-to-fine manner is disclosed. In particular, at the $s^{th}$ scale, given the shape prior from the previous scale $Q^{s-1}$, the finer shape prior $Q^s$ is estimated using candidate local shape masks $z^s_{km}$. At the end, the binary segmentation $\hat{Y}$ can be computed by applying a pre-defined threshold to the shape prior $Q^3$ at the finest scale.

A typical object segmentation energy function given an object shape prior can be formulated as a MRF energy function:

$$E(Y) = \sum_{i \in \mathcal{V}} U(y_i) + \gamma \sum_{i,j \in \mathcal{E}} V(y_i, y_j) + \lambda \sum_{i \in \mathcal{V}} S(y_i, q_i)$$

where $y_i$ is the binary label at pixel i, $q_i$ is the probability at pixel i of shape Q. Note that the scale index s is omitted to simplify the description. The unary term for each pixel $U(y_i)$ is the negative log likelihood of the label $y_i$ being given the pixel color $c_i$ and Guassian Mixture Models (GMMs) $A_1$ and $A_0$ for foreground and background color, $$U(y_i) = -\log P(y_i | c_i, A_1, A_0).$$

The pairwise term $V(y_i, y_j)$ measures the cost of assigning different labels to two adjacent pixels, which is usually based on their color difference, $$V(y_i, y_j) = \exp(-\beta \|c_i - c_j\|^2) \mathbb{I}_{(y_i \neq y_j)},$$

where the parameter $\beta$ is estimated by the mean color difference over the image and $\mathbb{I}(\cdot)|$ is an indicator function.

The shape term $S(y_i, y_i)$ measures the inconsistency with shape prior Q, $$S(y_i, y_i^{s-1}) = -\log Q_i^{y_i}(1 - Q_i)^{1-y_i}.$$

The energy function can be obtained by alternating two steps: (1) updating GMM color models from the current segmentation $\{A1; A0\} \leftarrow Y$; and (2) solving the MRF energy function with updated color models: $Y \leftarrow \{A1; A0\}$. However, this method is too sensitive to the parameter $\lambda$. On one hand, if the $\lambda$ is large, the color models cannot correct the mistakes in the shape prior; on the other hand, if the $\lambda$ is small, the segmentation may deviate from the good shape prior.

High Order MRF with Local Shape Transfer

To use candidate local shape masks to resolve segmentation ambiguities, a patch likelihood $P_{cand}(Y(\Delta_k))$ is included that encourages the label patch $Y(\Delta_k)$ for image patch $I(\Delta_k)$ to be similar to some candidate local shape mask $z_{km} = Y_m(\Delta_{km})$ for database image patch $I_m(\Delta_{km})$:

$$E'(Y) = E(Y) - \sum_k \log(P_{cand}(Y(\Delta_k)))$$

The last term is the negative Expected Patch Log Likelihood (EPLL) used for image patches to produce state-of-the-art results on inverse problems such as deblurring. Here the patch likelihood is defined on local shape masks by marginalizing out over a hidden variable $m^*_k$ that indicates which database patch $\Delta_{km}$ is selected for transfer to the output patch $Y(\Delta_k)$:

$$P_{cand}(Y(\Delta_k)) = \sum_{m=1}^{M} P(Y(\Delta_k), m^*_k = m) = \sum_{m=1}^{M} P(Y(\Delta_k) | m^*_k = m) P(m^*_k = m) =$$

$$\sum_{m=1}^{M} \frac{\exp(-\eta \|Y(\Delta_k) - z_{km}\|_2^2)}{Z_1} \frac{\exp(-\tau d_{km})}{Z_2},$$

where the second term expresses the probability by image appearance to transfer the $m^{th}$ candidate label patch and the first term expresses that the output label patch should be similar to the transferred patch. $Z_1$, $Z_2$ are normalization terms, and $d_{km}$ is the match cost discussed above. Optimizing the high order MRF is challenging because, for labeling every non-border pixel, its adjacent and also superimposed local masks must be checked. Assuming that $\eta$ is large encourages the output label patches $Y(\Delta_k)$ to be as similar to the selected candidate patches $z_{km*k}$ as possible. For large $\eta$ and distinct $z_{km}$, $$P_{cand}(Y(\Delta_k)) \approx \begin{cases} \exp(-\tau d_{km})/Z_2 & \text{if } Y(\Delta_k) = z_{km} \\ 0 & \text{otherwise} \end{cases}$$

and $$E'(Y) \approx E(Y) + \tau \sum_k H(Y(\Delta_k)),$$

where $$H(Y(\Delta_k)) = \begin{cases} d_{km} & \text{if } Y(\Delta_k) = z_{km} \\ \infty & \text{otherwise} \end{cases}$$

Note that this approximate energy is related to the Non-parametric Higher-order Random Field (NHRF) that only considers top-down local appearance matching but not the bottom-up global image cues.

Approximate Optimization on Patches

The approximate energy on patch $\Delta_k$ is:

$$E'(Y(\Delta_k)) = \sum_{i \in \Delta_k} U(y_i) + \gamma \sum_{i,j \in \Delta_k} V(y_i, y_j) + \lambda \sum_{i \in \Delta_k} S(y_i, q_i) + \tau H(Y(\Delta_k))$$

and can be optimized by selecting the local shape mask $\hat{z}_k$ with minimum energy:

$$E'(\hat{z}_k) \leq E'(z_{km}), \forall \hat{z}_k \neq z_{km}.$$

Thus, the global energy minimization problem is approximated by a set of independent patch-wise energy minimization sub-problems, which are easier to solve in parallel. As a result, the shape prior Q is obtained by averaging the selected local shape masks $\hat{z}_k$ on their corresponding patches and the binary segmentation Y by a pre-defined threshold $\theta$, $$y_i = 1, \text{ if } q_i \geq \theta; 0, \text{ if } q_i < \theta$$

If the independently selected patches $z_{km_k}^*$ for $Y(\Delta_k)$ minimize the approximate energy on the patch agree in all overlapping areas, there is a valid binary image segmentation Y' from the overlapped patches, and this Y' is an approximate solution to the higher order potential when $\eta$ is large. Under normal circumstances this perfect overlap will rarely occur, and the labels for each pixel are averaged (and then thresholded) to get a binary image segmentation Y. The binary segmentation Y is also an approximate minimizer of:

$$E'(Y) = E(Y) - \sum_k \log(P_{cand}(Y(\Delta_k)))$$

when $\eta$ is large because the patches in Y have small deviations from the independently selected patches $z_{km_k}^*$ (and have no deviations where there is perfect overlap).

Iteratively, the color models $\{A_1, A_0\}$ are updated by the current segmentation Y. By alternating between local mask selection in $$E'(z_k) \leq E'(z_{km}), \forall \hat{z}_k \neq z_{km}.$$

and a color model update in $$U(y_i) = -\log P(y_i | c_i, A_1, A_0).$$

the algorithm actually solves a MRF energy minimization problem in a novel structured label space that consists of candidate local shape masks without using GraphCut-like global optimization.

A simple iterative object segmentation algorithm, referred to herein as "Patch Cut" includes the following steps:

| Algorithm 1 The single scale PatchCut algorithm. | |
|---|---|
| 1: | while do not converge do |
| 2: | for each patch $\Delta_k$, select the candidate local shape mask $\hat{z}_k$ with the minimum energy by (10) |
| 3: | estimate the shape prior Q by averaging $\hat{z}_k$, and the segmentation $\hat{Y}$ by (11) |
| 4: | update the foreground and background GMM color models $\{A_1, A_0\}$ by (2). |
| 5: | end while |

Figure 12:
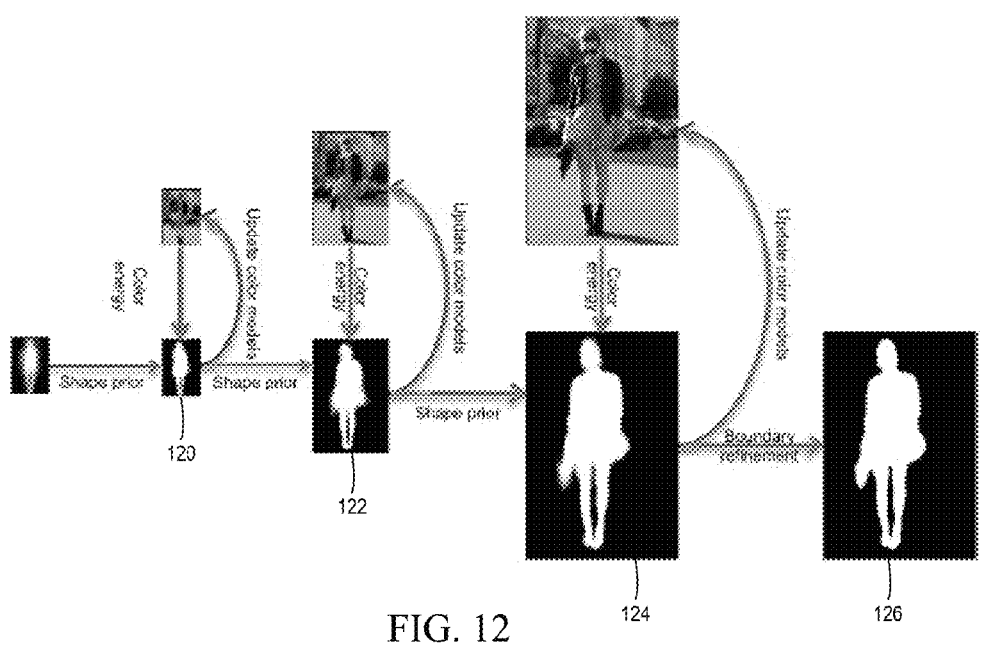
FIG. 12 illustrates a diagram of a Patch Cut algorithm for object segmentation.

FIG. 12 illustrates a diagram of a Patch Cut algorithm for object segmentation. A number M (e.g., 16) segmentation examples are retrieved and the object segmentation is initialized by averaging the global segmentation masks transferred from examples at the smallest scale 120. At each subsequent scale 122, 124, the shape prior is upsampled and the algorithm solved with iterative color models and the patch segmentation masks transferred. The final object segmentation can be further refined by a graph cut-based algorithm to provide a final segmentation 126.

Figure 13:
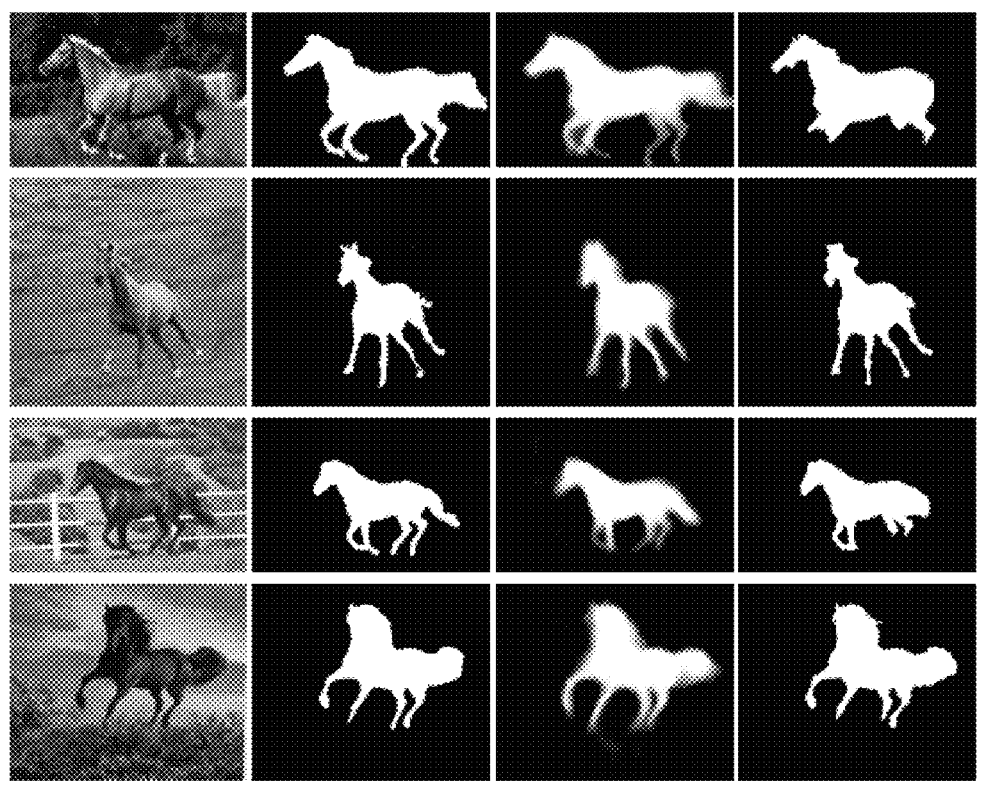
FIG. 13 illustrates examples of using the image segmentation techniques disclosed herein to identify objects in images.
Figure 14:
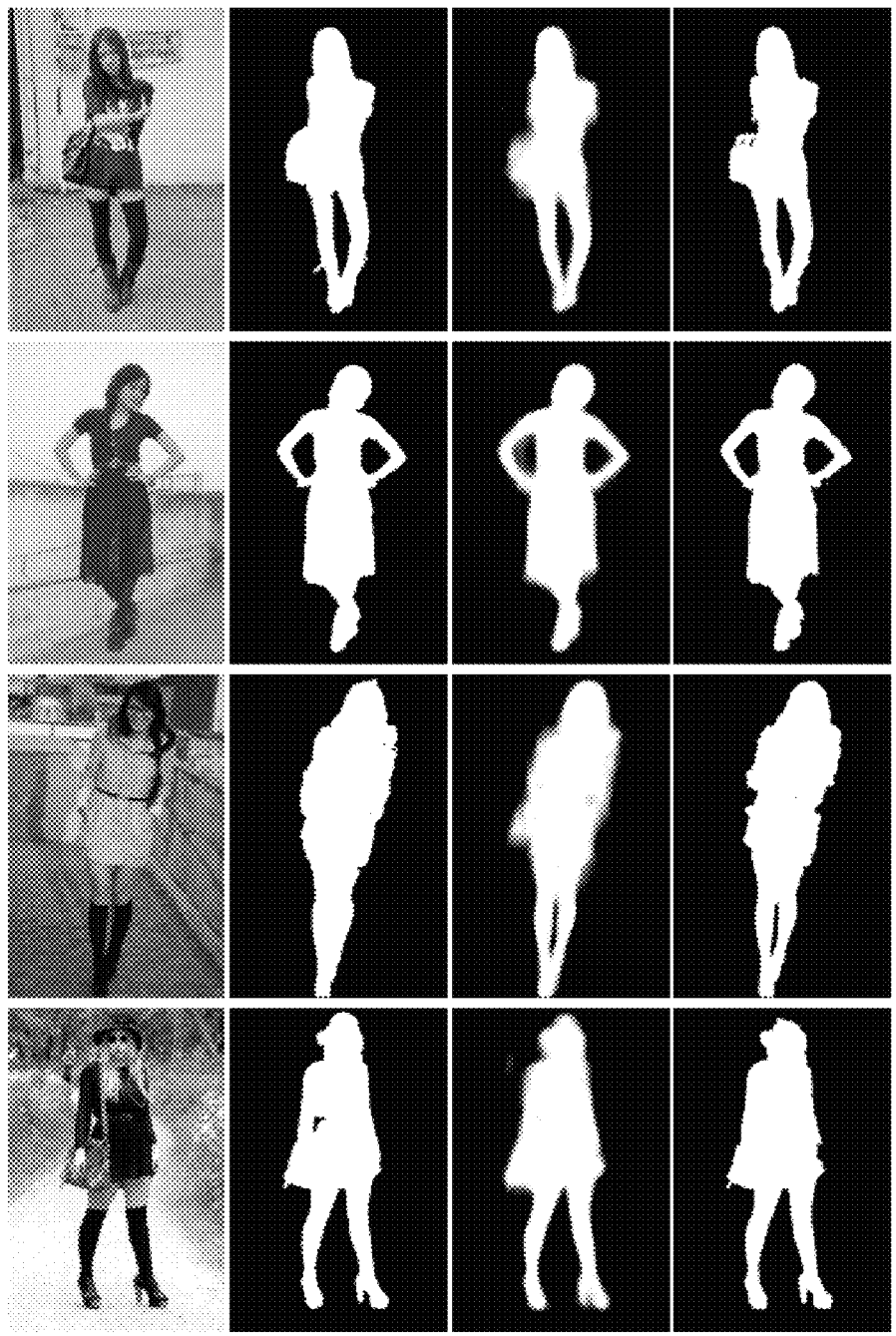
FIG. 14 illustrates examples of using the image segmentation techniques disclosed herein to identify objects in images.

FIGS. 13 and 14 illustrate examples of using the image segmentation techniques disclosed herein to identify objects in images.

Exemplary Computing Environment

Figure 15:
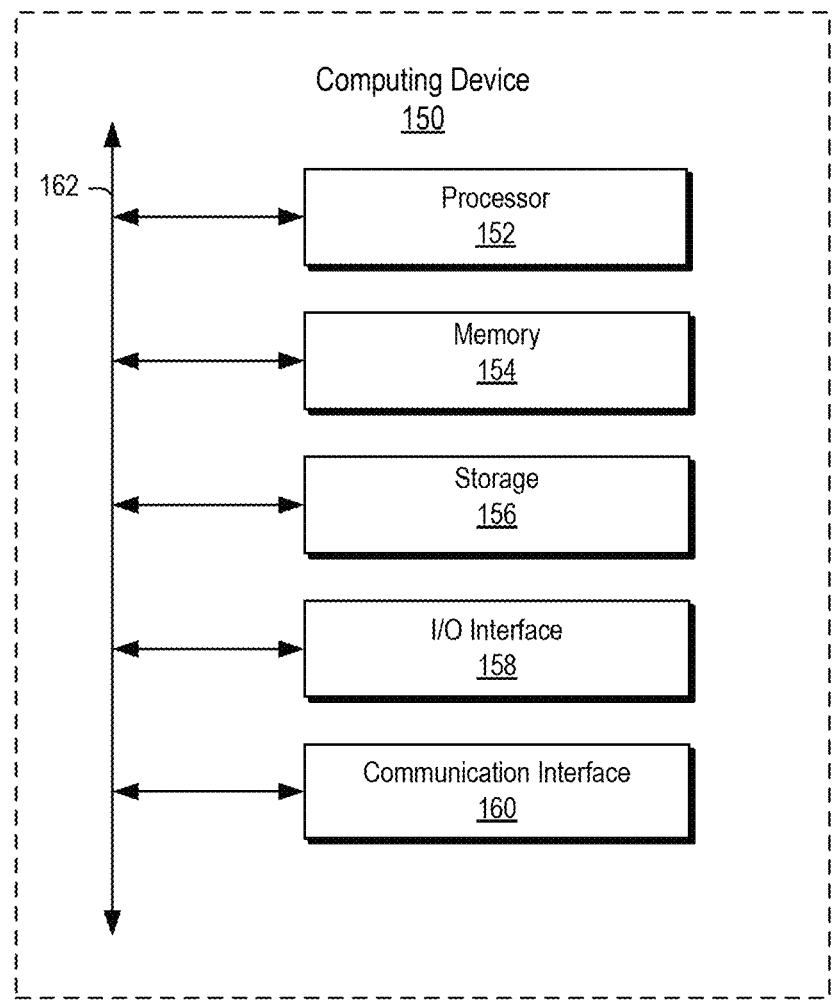
FIG. 15 is a block diagram depicting example hardware implementations.

Any suitable computing system or group of computing systems can be used to implement the techniques and methods disclosed herein. For example, FIG. 15 is a block diagram depicting examples of implementations of such components. The computing device 150 can include a processor 152 that is communicatively coupled to a memory 154 and that executes computer-executable program code and/or accesses information stored in the memory 154 or storage 156. The processor 152 may comprise a microprocessor, an application-specific integrated circuit ("ASIC"), a state machine, or other processing device. The processor 152 can include one processing device or more than one processing device. Such a processor can include or may be in communication with a computer-readable medium storing instructions that, when executed by the processor 152, cause the processor to perform the operations described herein.

The memory 154 and storage 156 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 150 may also comprise a number of external or internal devices such as input or output devices. For example, the computing device is shown with an input/output ("I/O") interface 158 that can receive input from input devices or provide output to output devices. A communication interface 160 may also be included in the computing device 150 and can include any device or group of devices suitable for establishing a wired or wireless data connection to one or more data networks. Non-limiting examples of the communication interface 160 include an Ethernet network adapter, a modem, and/or the like. The computing device 150 can transmit messages as electronic or optical signals via the communication interface 160. A bus 162 can also be included to communicatively couple one or more components of the computing device 150.

The computing device 150 can execute program code that configures the processor 152 to perform one or more of the operations described above. The program code can include one or more modules. The program code may be resident in the memory 154, storage 156, or any suitable computer-readable medium and may be executed by the processor 152 or any other suitable processor. In some embodiments, modules can be resident in the memory 154. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for automatically segmenting an object in an input image by referencing a dataset of already-segmented example images, the method comprising:
   identifying, by one or more computing devices, multiple already-segmented example images in the dataset based on the multiple already-segmented example images being similar to the input image;
   identifying, by the one or more computing devices, a respective patch in each of the multiple already-segmented example images based on the respective patch being similar to an area of the input image including a patch of the input image;
   comparing, by the one or more computing devices, the input image with each respective patch of the multiple already-segmented example images to identify which respective patch of the multiple already-segmented example images is most similar to the area of the input image including the patch of the input image;
   identifying, by the one or more computing devices, a mask of the most similar patch of the already-segmented example images, the mask representing a segmentation in the corresponding already-segmented example image; and
   segmenting, by the one or more computing devices, the object in the input image based on at least a portion of the mask of the most similar patch of the corresponding already-segmented example image.

2. The method of claim 1, wherein the most similar patch of the already-segmented example images is identified based on a particular respective patch being a better match for the area of the input image including the patch of the input image than other respective patches in the already-segmented example images.

3. The method of claim 1, wherein segmenting the object in the input image is based on a plurality of masks from a plurality of patches in the multiple already-segmented example images, each of the plurality of masks used to segment different portions of the input image.

4. The method of claim 1, wherein the mask of the most similar patch is identified based on mask similarity in patches of the already-segmented example images that would partially overlap one another once transferred to the input image, wherein the patches of the already-segmented example images that partially overlap one another do not entirely overlap one another.

5. The method of claim 1, further comprising using the patch of the input image or the already-segmented example images at multiple scales to identify masks from the patches in the already-segmented example images in the dataset.

6. The method of claim 1, further comprising using relatively larger patches of the already-segmented example images or smaller resolutions of the already-segmented example images to identify large structures of the object in the input image and relatively smaller patches the already-segmented example images or higher resolutions of the already-segmented example images to localize boundaries of the object in the input image.

7. The method of claim 1, further comprising iteratively running an optimization that identifies an optimized segmentation of the input image, wherein the optimization is initially run using relatively larger patches to provide results and the results are used to rerun the optimization using progressively smaller and smaller patches.

8. The method of claim 1, further comprising determining alternative object segmentations based on patches from a plurality of the already-segmented example images of the dataset being similar to the patch of the input image.

9. The method of claim 1, further comprising determining alternative object segmentations based on patches from a plurality of the already-segmented example images of the dataset being clustered into groupings, wherein each grouping is used to determine a respective alternative object segmentation.

10. The method of claim 1, further comprising presenting alternative object segmentations in a user interface, wherein the user interface allows user selection of an alternative object segmentation.

11. The method of claim 1, further comprising displaying a mask depicting the segmentation of the input image in a user interface.

12. The method of claim 1, further comprising:
initializing an optimization to segment the object in the input image to provide an initial segmentation, the optimization initialized based on at least one of: saliency of the object in the input image, use of a specially-trained model, user input providing an approximate segmentation, user input providing an approximate object boundary, user input identifying a point on the object, user input identifying an approximate center of the object, user input providing an approximate object location, user input providing an approximate object localization, or user input providing an approximate object size,
wherein, after initialization, the optimization refines the initial segmentation by referencing masks in patches in the already-segmented example images of the dataset.

13. The method of claim 1, wherein segmenting the object in the input image is based both on the mask of the patch of the already-segmented example image and saliency of the object in the input image.

14. The method of claim 1, wherein input is received identifying a portion of the input image that includes the object to be segmented, wherein segmenting the object in the input image comprises localizing patch masks from a set of the already-segmented example images in the dataset comprising content similar to content within the portion of the input image.

15. A system comprising:
a processor for executing instructions stored in computer-readable medium on one or more devices;
a non-transitory computer readable medium comprising the instructions, wherein when executed by the processor, the instructions cause the processor to perform operations comprising:
identifying multiple already-segmented example images in a dataset based on the multiple already-segmented example images being similar to an input image;
identifying a respective patch in each of the multiple already-segmented example images based on the respective patch being similar to an area of the input image including a patch of the input image;
comparing the input image with each respective patch of the multiple already-segmented example images to identify which respective patch of the multiple already-segmented example images is most similar to the area of the input image including the patch of the input image;
identifying a mask of the most similar patch of the already-segmented example images, the mask representing a segmentation in the corresponding already-segmented example image; and
segmenting an object in the input image based on at least a portion of the mask of the most similar patch of the corresponding already-segmented example image.

16. The system of claim 15, wherein identifying the mask of the most similar patch comprises identifying the most similar patch of the already-segmented images based on the respective patch being a better match for the area of the input image including the patch of the input image than other patches in other already-segmented example images of the dataset.

17. A non-transitory computer-readable medium on which is encoded program code, the program code comprising:
program code for identifying multiple already-segmented example images in a dataset based on the multiple already-segmented example images being similar to an input image;
program code for identifying a respective patch in each of the multiple already-segmented example images based on the respective patch being similar to an area of the input image including a patch of the input image;
program code for comparing the input image with each respective patch of the multiple already-segmented example images to identify which respective patch of the multiple already-segmented example images is most similar to the area of the input image including the patch of the input image;
program code for identifying a mask of the most similar patch of the already-segmented example images, the mask representing a segmentation in the corresponding already-segmented example image; and
program code for segmenting an object in the input image based on at least a portion of the mask of the most similar patch of the corresponding already-segmented example image.

18. The non-transitory computer-readable medium of claim 17 wherein segmenting the object in the input image is based on a plurality of masks from a plurality of patches in the multiple already-segmented example images of the dataset, each of the a plurality of masks used to segment different portions of the input image.

19. The non-transitory computer-readable medium of claim 17 wherein further comprise using the patch of the input image or the already-segmented example images at multiple scales to identify masks from the patches in the already-segmented example images.

20. The system of claim 15, wherein the operations further comprise using the patch of the input image or the already-segmented example images at multiple scales to identify masks from the patches in the already-segmented example images.

* * * * *

UNITED STATES PATENT AND TRADEMARK OFFICE
CERTIFICATE OF CORRECTION

PATENT NO. : 9,607,391 B2  Page 1 of 1
APPLICATION NO. : 14/817731
DATED : March 28, 2017
INVENTOR(S) : Brian Price et al.

It is certified that error appears in the above-identified patent and that said Letters Patent is hereby corrected as shown below:

Column 15, Claim 5, Line 4:
Delete "in the dataset"

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*